(No Model.) 4 Sheets—Sheet 3.
F. C. GAMMONS.
PNEUMATIC SEED COTTON CONVEYER.
No. 516,733. Patented Mar. 20, 1894.
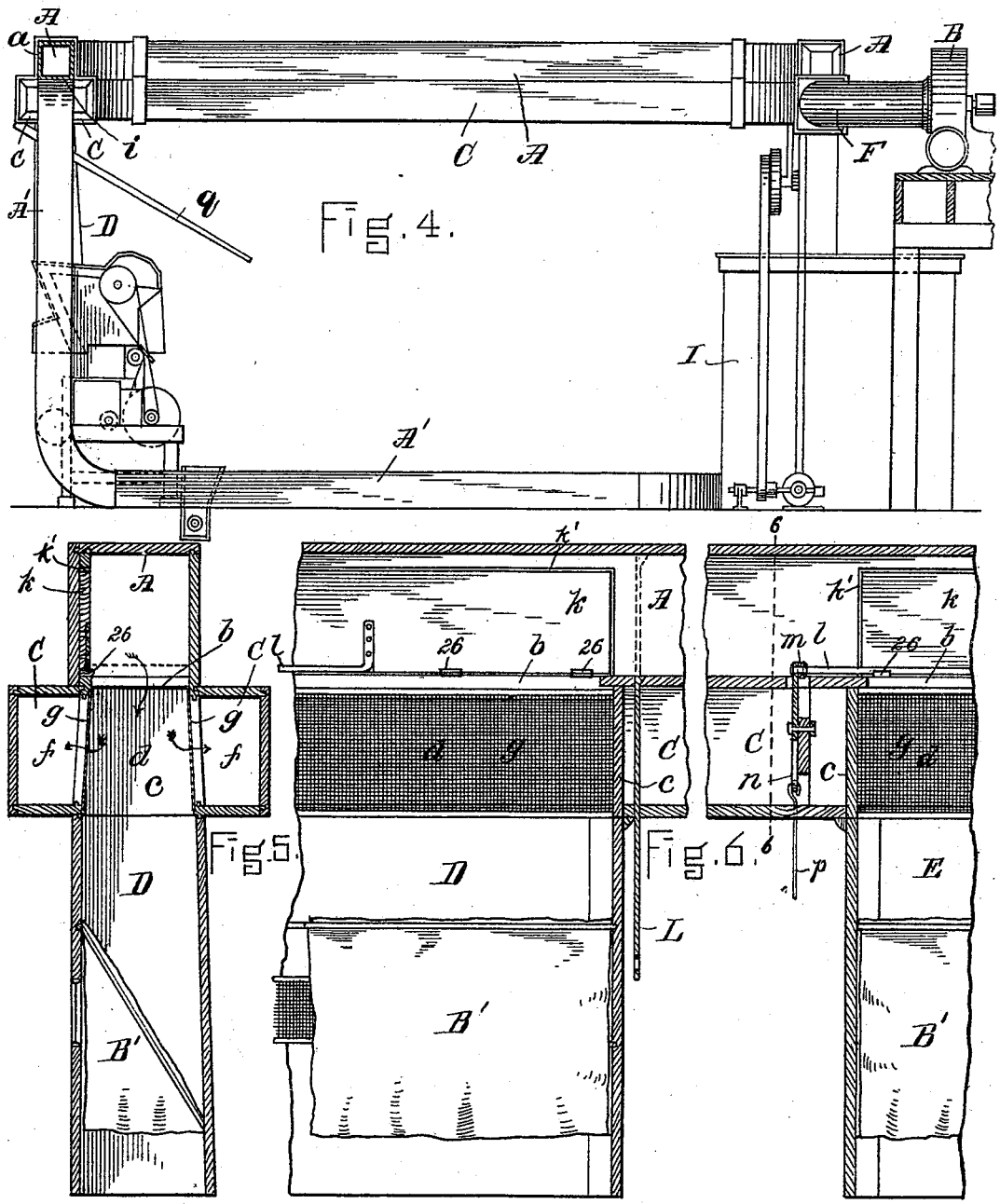
WITNESSES.
Henry Marsh.
Harry W. Aiken.
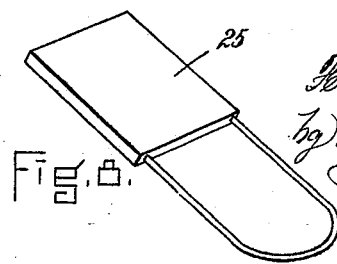
INVENTOR.
Ferdinand C. Gammons
by F. C. Tebchemacher
Atty.

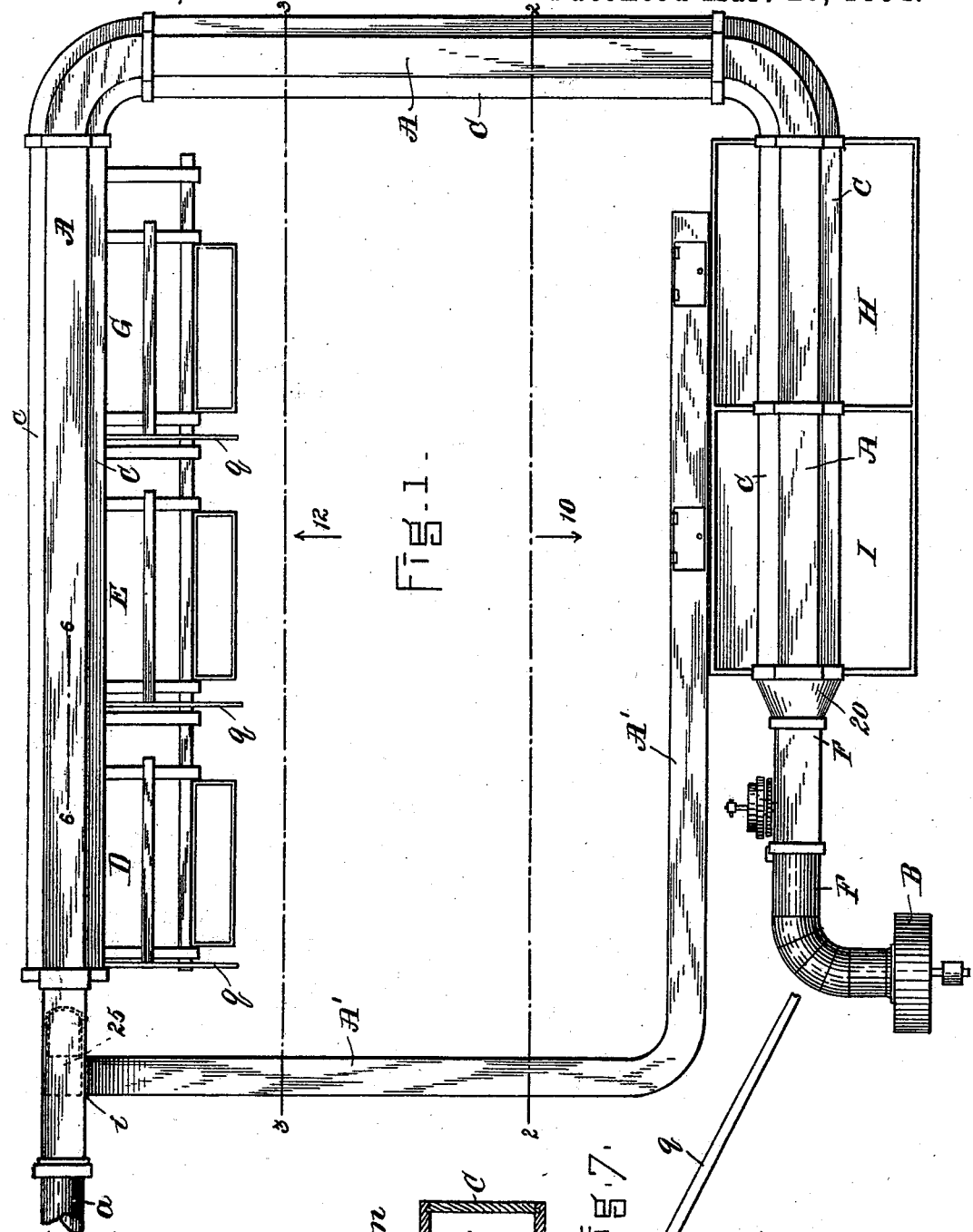

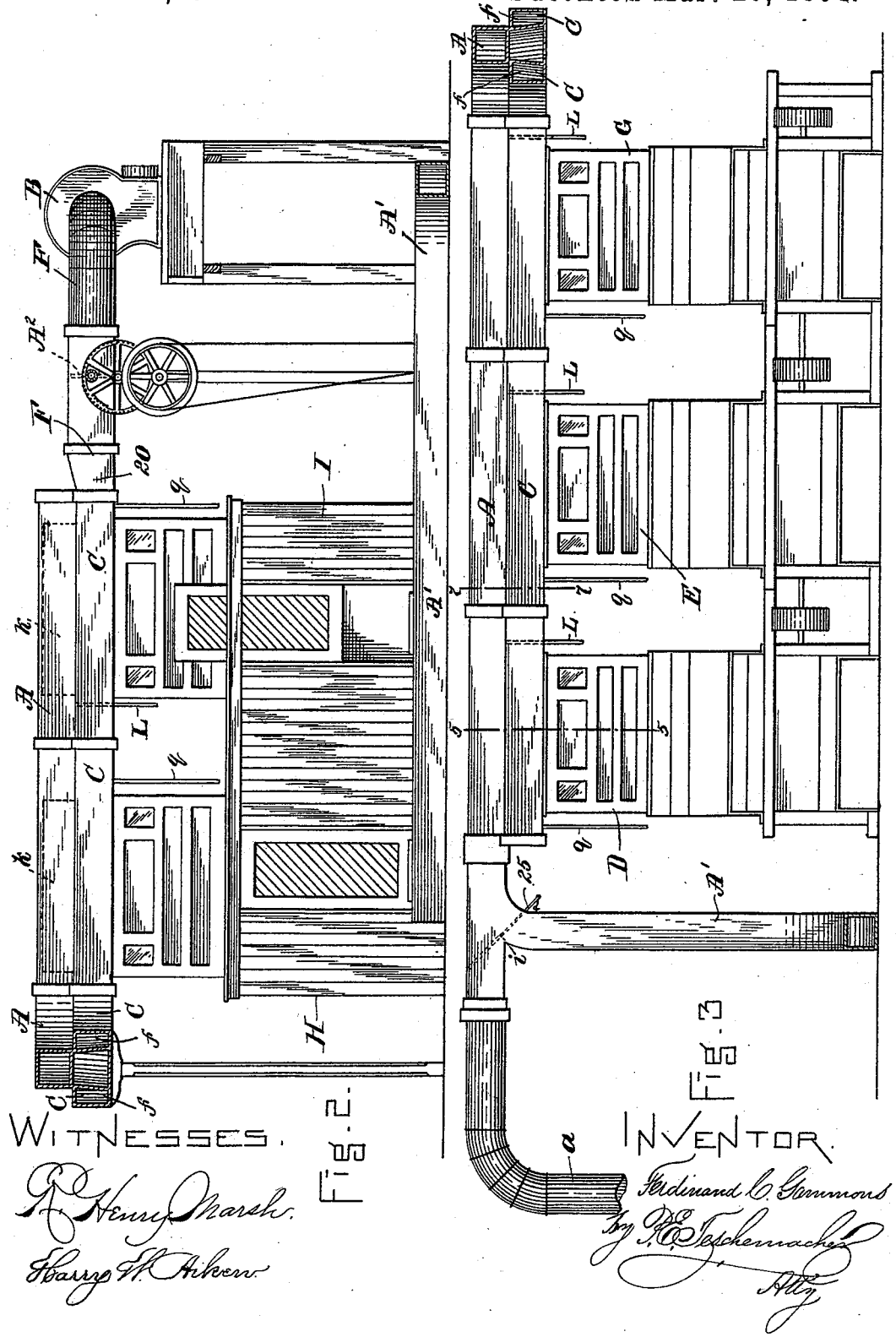

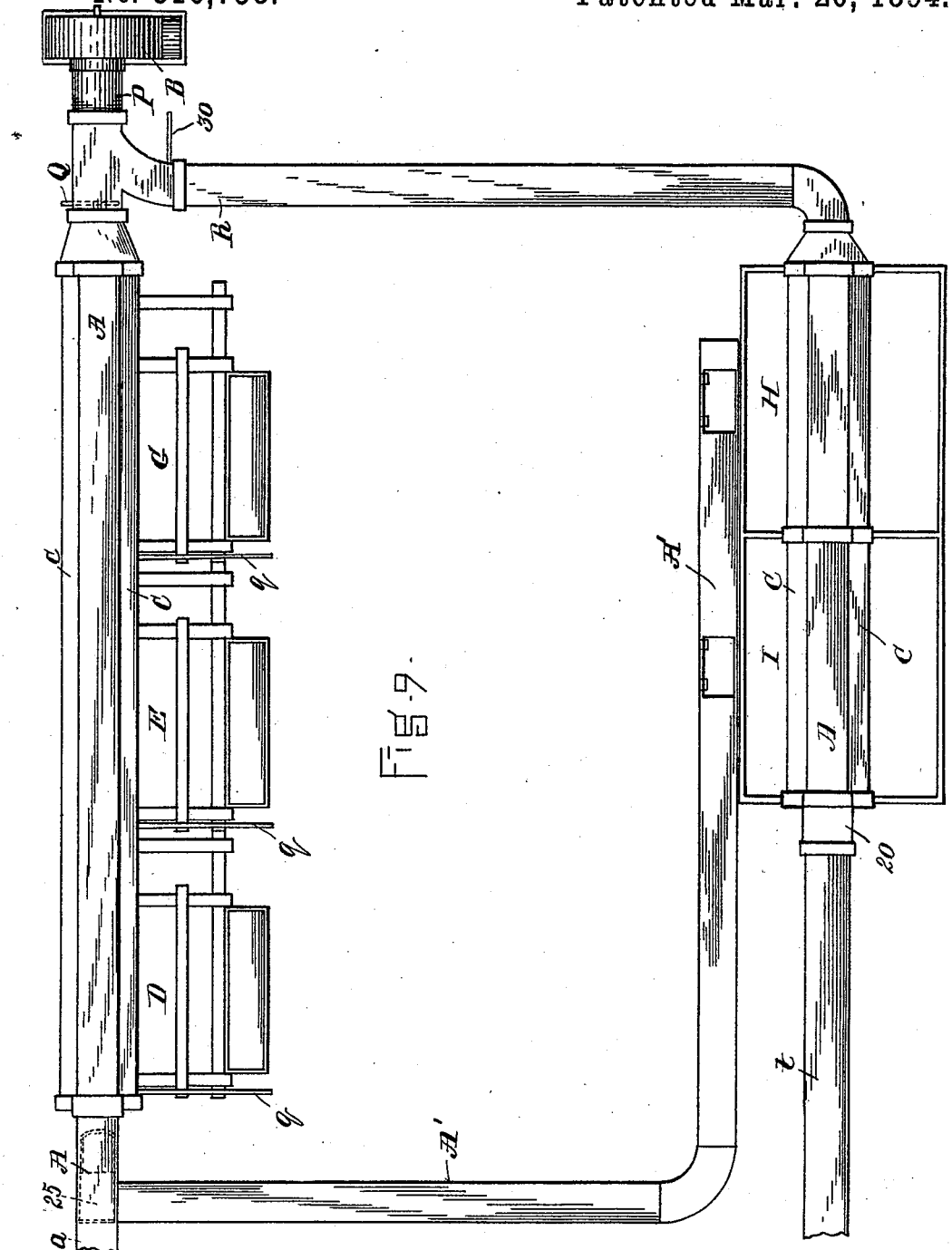

UNITED STATES PATENT OFFICE.

FERDINAND C. GAMMONS, OF BRIDGEWATER, MASSACHUSETTS, ASSIGNOR TO THE EAGLE COTTON GIN COMPANY, OF SAME PLACE.

PNEUMATIC SEED-COTTON CONVEYER.

SPECIFICATION forming part of Letters Patent No. 516,733, dated March 20, 1894.

Application filed September 14, 1893. Serial No. 485,508. (No model.)

*To all whom it may concern:*

Be it known that I, FERDINAND C. GAMMONS, a citizen of the United States, residing at Bridgewater, in the county of Plymouth and State of Massachusetts, have invented certain new and useful Improvements in Pneumatic Seed-Cotton Conveyers, of which the following is a full, clear, and exact description, reference being had to the accompanying drawings, making part of this specification, in which—

Figure 1 is a plan-view of a pneumatic seed-cotton conveyer constructed in accordance with my invention. Fig. 2 is a sectional elevation of the same on the line 2, 2, of Fig. 1, looking in the direction of the arrow 10. Fig. 3 is a sectional elevation on the line 3, 3, of Fig. 1, looking in the direction of the arrow 12. Fig. 4 is an end elevation of the apparatus. Fig. 5 is an enlarged transverse vertical section on the line 5, 5, of Fig. 3. Fig. 6 is an enlarged longitudinal vertical section on the line 6, 6, of Fig. 1. Fig. 7 is an enlarged transverse vertical section on the line 7, 7, of Fig. 3 or line 6—6 of Fig. 6. Fig. 8 is a detail to be referred to. Fig. 9 is a plan view of a modification of my invention to be referred to.

My invention relates to an improvement on the pneumatic seed-cotton conveying apparatus for which Letters Patent of the United States No. 472,607 were granted to Stephen D. Murray on the 12th day of April, 1892, and has for its object to improve the construction of the apparatus whereby the delivery of the cotton to the gin-feeding boxes or other locations, can be controlled and regulated more perfectly and economically, thereby avoiding waste and the liability of the cotton becoming packed in the conveyer-tube and obstructing the same. In the aforesaid apparatus as heretofore constructed, no means has been provided to prevent the seed-cotton from being distributed to all the cotton-receiving boxes or gin-feeders alike; and when one gin was out of repair or not required to be used, the cotton could not be shut off from the receiving-box or feeder connected therewith. By my improvement I am enabled to run any one of the gins in the series and shut off the cotton from those not in use.

To this end my invention consists in certain novel devices whereby each of the gin-feeding boxes or bins may be independently cut off from communication with the pneumatic conveyer-tube without in the least diminishing the force of the draft therethrough, or interfering with the supply of cotton to the remaining boxes or receivers; and my invention also consists in a novel arrangement of parts whereby the cotton can be drawn through the conveyer-tube into bins or receptacles located beyond the cotton-gin-feeders, and afterward, when desired, drawn out of said bins or receptacles and again carried by a branch or return-pipe into the main conveyer-tube and thence to the gin-feeding boxes, a single exhaust-fan only being required for the entire apparatus, as hereinafter more fully set forth.

In the said drawings, A represents a horizontally arranged pneumatic tube or conveyer, one end $a$, of which leads to a wagon or other place or receptacle from which the cotton is to be drawn by suction and carried forward to the cotton-gin feeders or other desired location, the suction being produced by means of an exhaust-fan B connected with the tube A in a manner to be hereinafter described.

Directly beneath the tube A and communicating therewith through a longitudinal opening $b$ in its bottom, as shown in Figs. 5 and 6, is a horizontally arranged box or casing C which is of greater width than the tube A and is divided up by partitions $c$ into central spaces $d$ into which the cotton falls from the said tube A through the openings $b$ and then passes by gravity into the receiving boxes or gin-feeders D, E, G, which are suitably secured to the bottom of the casing C and are in communication with the said spaces $d$. Lengthwise of the casing C on each side is formed an air passage $f$, Figs. 2 and 5, which is separated from the central spaces $d$ by wire-gauze screens $g$ through which the incoming air passes from the tube A and spaces $d$ to said passages $f$ and thence by a tube F connected with said passages at 20, Fig. 1, to the exhaust fan B. The number of central spaces or open portions $d$ formed in the casing C will of course depend upon the number of cotton-gins which it is desired to connect with the apparatus, and these spaces $d$, (one for each cotton-gin,) may be arranged at any desired distance apart, according to the requirements of the case.

The apparatus thus far described is substantially the same as that described in the said patent of S. D. Murray, and forms no part of my invention. The conveyer-tube A and casing C are both preferably extended, as shown, beyond the last receiving box or gin-feeder G and connected with one or more bins or receptacles H, I, as shown in Figs. 1 and 2, in the same manner as with the feeders D, E, G, above described; and connected with the bins H, I, is a tube A' which is connected with the main conveyer-tube A at a point $i$, in advance of the first gin-feeding box D, thus forming a complete circuit, whereby any cotton contained in either or both of said bins can be sucked out by the action of the exhaust-fan B and carried to the gins in the same manner as from the wagon, a suitable sliding gate or cut-off valve 25, Figs. 3 and 8, being placed in the portion $a$, of the conveyer tube between the point $i$ and the open end of the tube which takes the cotton from the wagon, said valve 25 being moved to close the said portion $a$, when the cotton is to be taken from the bins H, I, or either of them. The slide-valve 25, shown in Figs. 3 and 8 is placed at the junction $i$ of the tubes A and A' and is adapted to close either one of the said tubes, but not both at the same time; thus when pushed up to its extreme limit it will close the main tube A, leaving the tube A' open, and when drawn down sufficiently to open the tube A it will close the tube A'.

Each of the gin-feeding boxes D, E, G, is provided with a flexible check-valve B' arranged in the lower part thereof, which valve, when the exhaust-fan is producing the suction, is kept tightly closed by the pressure of the external air from beneath, thus enabling the full force of the suction to be utilized in drawing the cotton from the source of supply.

I will now describe the device which I employ for controlling and regulating the supply of cotton to each particular gin-feeder, bin, or receptacle, or cutting off the supply entirely from the gin-feeders and causing all of the cotton to pass into the bins or receptacles beyond, in case it should not be desired to operate the gins at the time of receiving a supply of cotton from a wagon. The receiving spaces $d$ over the gin-feeding boxes and bins are each provided with a lid or cover $k$ which is hinged at 26, Figs. 5 and 6, to the lower edge of the tube A, and is adapted to be swung upward within recesses $k'$ in one vertical wall of said tube, and lie snugly against one side of the same flush with the surface thereof as shown in Figs. 5 and 6, in which position it leaves the space $d$ entirely open and offers no obstruction to the passage of the cotton to the box or receptacle beneath. When however any particular gin-feeding box or receptacle is not required to be used, its cover $k$ is swung down as shown dotted in Fig. 5, thus entirely closing the box and excluding the cotton therefrom. When the cover $k$ is swung down it forms a bottom for the conveyer-tube, leaving the same free and clear for the passage of the cotton over the closed box to the box or boxes beyond. The cover $k$ is swung up and down by means of an arm or lever $l$ shown in Fig. 6, secured thereto and having a crank arm $l'$ see Fig. 7 connected by a link $m$, with a lever $n$, the latter fulcrumed at 18 and connected by a rod $p$ with a hand-lever $q$ pivoted in a convenient position beneath the casing C, said lever mechanism being arranged within the air-space between the partitions $c$ as shown in Fig. 6.

At the farther end of each cotton receiving box or receptacle, the tube A is provided with a vertical slide L forming a cut-off for preventing the cotton from passing beyond that point in the tube A. This slide L moves in suitable guide-slots with sufficient friction to hold it in place, and extends down through the casing C beneath which it is provided with a handle or finger-hole whereby it may be moved up or down to close or open the tube A at that particular point; said slide, when raised as shown dotted in Fig. 6, completely closing tube A and preventing the cotton from passing beyond the point where it is desired to deposit it, thus avoiding waste and liability of the cotton becoming packed in that part of the tube A beyond the last box or receptacle in which it is desired to deposit the cotton.

The manner in which the slides L are used in connection with the hinged covers $k$ is as follows: Should it be desired only to use the one gin nearest to the wagon or receptacle from which the seed-cotton is taken, it is simply necessary to close the vertical slide L at the farther end of the gin-feeding box D, which will exclude the cotton from the remaining portion of the tube A and cause the cotton to pass into the said box D, the air being sucked through the screens $g$ on each side of the case C immediately over said feeding-box. If it is desired to use the first two gins connected with the boxes D and E, the vertical slide L at the farther end of the second box E will be closed, when the cotton will be drawn into the said boxes D, E, as required. In case the center gin only is to be used, it is merely necessary to push up the slide L at the farther end of the second box E and close the lid or cover $k$ of the first box D when the cotton will pass over the first box into the second box and be prevented from passing beyond into the third box G by the closed slide L. If it should be desired to use the third gin only, or that farthest from the wagon, the covers $k$ of the first two boxes D and E must be closed and the slide L at the farther end of the box G pushed up, which will permit the cotton to pass over the covers k of the boxes D and E into the box G but no farther. By means of the hinged covers k, I can shut off the supply from any box or boxes to favor one or the other; for example, if the box farthest from the source of supply is not receiving sufficient cotton, I can, by simply closing the covers k of the first and second boxes, cause all the cotton to pass into the third box, and in this manner secure a uniform supply to all the boxes as required. In case I should not desire to gin the cotton at the time it is received, but wish to place it in the bins H, I, or either of them, I simply have all the slides L drawn down, and close all the hinged covers k of the feeding boxes over the gins, and allow the cotton to pass over them all to the bins and be deposited therein; the passage of the cotton to each bin being controlled as before stated by a cover k and vertical slide or cut-off L operated in the same manner as those for the feed-boxes of the gins. If it should be desired to take up the cotton from the wagon faster than the gins will gin it, the surplus cotton can be carried over into the bins to be used after the wagon has gone for more cotton, or at any other convenient time. When the cotton is to be taken directly from the bins H, I, the tube A' is used as before described, the conveyer tube A between the point i and the inlet end a, having been first closed by pushing in the slide 25. The cotton is then drawn into the main conveyer-tube A in advance of the gin-feeders to which it is carried in the manner previously described. The above described arrangement of parts is of the utmost importance and presents great advantages over any other apparatus of this description hitherto in use, as in many cases it is very desirable to provide means for unloading cotton by suction which is not to be ginned at that time, which can be easily accomplished by means of my hinged covers, vertical slides, and cut-off valves or gates, and it will be obvious that by my improvements I am enabled with a single exhaust-fan to perform a great amount of additional work unattainable in any machine heretofore constructed with which I am acquainted; my apparatus being capable of passing the cotton into any particular gin-feeding box or boxes required, or into all of them, or passing it over or beyond all of said boxes without entering any one of them, and carrying it to bins or receptacles in another part of the house and afterward taking it at will from any one or all of said bins and again passing it to the gin-feeders, or if desired around to the bins a second time. The latter however would only be required in case it should be desired to more thoroughly cleanse the cotton.

A² is an air or cut-off valve located near the exhaust fan B as shown in Fig. 2, and adapted to be operated automatically at fixed intervals, corresponding to the time required to fill the cotton-receiving boxes, by suitable mechanism similar to that shown and described in Letters Patent of the United States No. 500,804, granted to me July 4, 1893, but as this mechanism forms no part of my present invention, it will not be herein further described.

In Fig. 9 is represented a modification of my invention, in which the exhaust-fan B is located in a different position from that shown in the other figures of the drawings, and in which two receiving inlets are provided for the cotton. In this case the exhaust fan B is connected with a horizontal extension P of the casing C, the two passages f, f, of which are united at this point, the extension P being provided with a shut-off valve or gate Q, beyond which is a branch-tube R leading to the bins H, I, where it is connected with a casing C and conveyer tube A arranged over said bins in the same manner, and having the same construction as those shown in Fig. 1. The conveyer-tube A is provided beyond the bin I with an extension or portion t adapted to receive cotton from a wagon in the same manner as the end a, two cotton-receiving inlets being thus provided which can be used at the same time if desired. The casing C over the bins is provided with screened side passages similar to the casing C above the gin-feeders as before described, and the cotton can thus be taken from a wagon through the portion t of the tube directly to the bins without having to pass over the gin-feeders as is the case with the construction and arrangement first shown and described. If it should be desired to unload two wagons at once, one from the end a, and the other from the end t, the valve or gate Q, and also a valve or gate 30 in the tube R must be opened, but if only one wagon is to be unloaded, the valve or gate which controls the inlet tube not in use will be preferably closed to increase the force of the suction. I regard this construction however as the full mechanical equivalent of that first described. A suction pipe A' similar to that shown in Figs. 1 and 3 extends from the bins to the main conveyer tube A in advance of the first gin-feeding box, whereby the cotton can be drawn from the bins when required by the action of the exhaust fan, in which case the cut-off valve or gate Q must be opened and the cut-off valve or gate 30 in the pipe R, preferably closed to increase the force of the suction; the cut-off valve or gate 25 being at the same time pushed in to close the inlet end a of the tube A.

What I claim as my invention, and desire to secure by Letters Patent, is—

1. In a seed-cotton conveyer, the combination, with a pneumatic conveyer-tube having openings in its under side, a box or casing having central spaces communicating with said pneumatic tube and provided with side air-passages having inner screen-walls, and a series of cotton-receiving boxes or receptacles communicating with said central spaces, of the lids or covers *k* located over the tops of the said receiving boxes and adapted when closed to exclude the cotton therefrom, and the slides or cut-off valves L applied to the conveyer-tube at the end of each of said receiving boxes and adapted to entirely close the conveyer tube and prevent the passage of the cotton through said tube beyond the last box or receptacle wherein it is to be deposited, substantially as set forth.

2. In a seed-cotton conveyer, the combination, with a pneumatic conveyer-tube A open at its bottom, a box or casing having spaces communicating with said pneumatic-tube and provided with side air-passages having inner screen-walls, and a series of cotton-receiving boxes or receptacles communicating with said central spaces, of a series of slides or cut-off valves L placed within the tube A, one at the farther end of each cotton-receiving box, and adapted to entirely close said tube and prevent the passage of cotton therethrough beyond the last box or receptacle wherein it is to be deposited, substantially as described.

3. In a seed-cotton conveyer, the combination of a pneumatic tube, a series of gin-feeding boxes communicating therewith, bins connected with an extension of said pneumatic tube, a return pipe extending from the bins to the main conveyer tube and communicating therewith at a point in advance of the first gin feeding box and forming a complete circuit, a cut-off valve or gate placed in the main conveyer tube between its open or inlet end and the junction of the return pipe therewith, and a single exhaust-fan connected with the conveyer tube and adapted to draw the cotton either from the inlet end of said conveyer tube directly into the gin-feeding boxes and bins, or from the bins into the gin-feeding boxes through the return pipe, all constructed and arranged to operate substantially as described.

4. In a seed-cotton conveyer, the combination of a series of gin-feeding boxes and storage bins or receptacles, a system of pneumatic tubes connected with said gin-feeding boxes and bins and having two separate and independent inlet ends for receiving the cotton, and a single exhaust-fan connected with said system of tubes, whereby the cotton can be drawn through one inlet directly to the gin-feeding boxes, and through the other inlet directly to the storage bins or receptacles, all constructed to operate substantially as described.

5. In a seed-cotton conveyer, the combination of a pneumatic-tube A, having a cotton receiving inlet *a*, and a box or casing C, the latter having an extension P, a series of gin-feeding boxes communicating with said pneumatic tube, an exhaust-fan connected with the extension P, bins or receptacles connected with said extension P by a branch tube R, a pneumatic supply-tube connected with said bins or receptacles, said tube having a portion *t* extending beyond the bins and provided with a cotton receiving inlet end, a return pipe A' leading from the bins to the main conveyer-tube in advance of the first gin-feeding box, and suitable cut-off valves or gates, all constructed and arranged to operate substantially in the manner and for the purpose set forth.

Witness my hand this 11th day of September, A. D. 1893.

FERDINAND C. GAMMONS.

In presence of—
P. E. TESCHEMACHER,
HARRY W. AIKEN.